E. D. BURLINGAME.
Thrashing Machine.
No. 35,990.
Patented July 29, 1862.
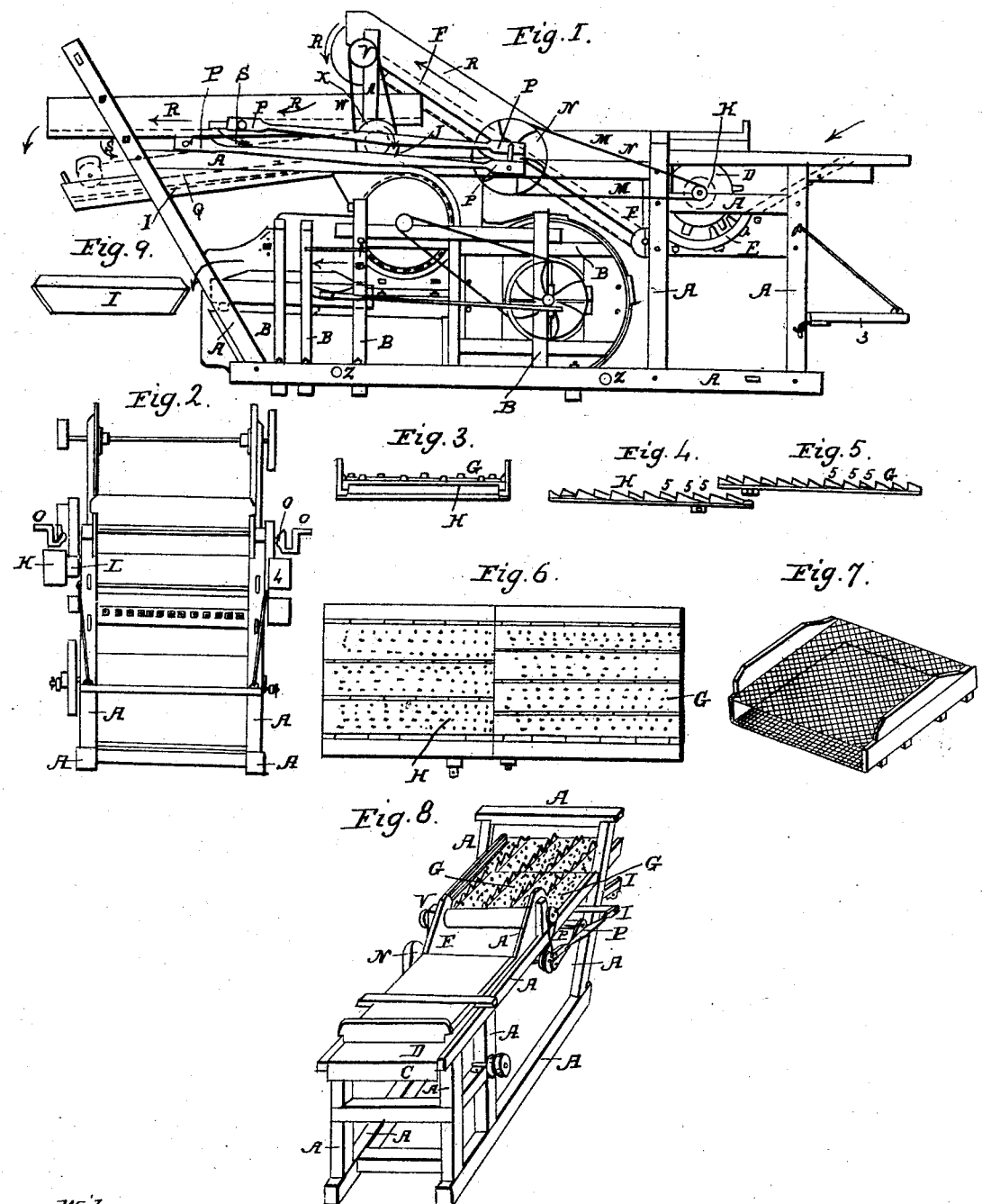
Witnesses.
Inventor:
Ezra D Burlingame

UNITED STATES PATENT OFFICE.

EZRA D. BURLINGAME, OF TECUMSEH, MICHIGAN.

IMPROVEMENT IN THRASHING-MACHINES.

Specification forming part of Letters Patent No. 35,990, dated July 29, 1862.

*To all whom it may concern:*

Be it known that I, EZRA D. BURLINGAME, of Tecumseh, Lenawee county, Michigan, have invented an Improvement in Machinery for Thrashing Clover; and I do hereby declare that the following is a full and exact description thereof, reference being had to the accompanying drawings, and to the letters and numerals of reference marked thereon.

The nature of my invention consists in the peculiar arrangement of certain parts of mechanism whereby a clover-thrasher is produced so constructed that it can be attached to any ordinary clover huller and cleaner, reference being had to the accompanying drawings and letters and numerals of reference marked thereon, of which—

Figure 1 is a side elevation exhibiting its several parts—viz., main frame A, apron C, cylinder D, concave E, carrier F, carrier-box I, pulley K, pulley L, belt M, pulley N, crank O, pitmen P, carrier Q, arrows R and S, pulley V, belt W, pulley X, wrists seen at the numerals 1, slots 2, and platform 3. The huller B, inclosed within a dark line in said Fig. 1, is intended to show relative positions when my clover-thrashing machinery is attached thereto for work and the mode of fastening to the same by means of the bolts Z. Fig. 2 exhibits an end view of the same machinery, showing the pulley 4. Fig. 3 exhibits an end view of bolts G and H detached from Fig. 1. Figs. 4 and 5 exhibit a side view of said bolts G and H, showing the places that the wrists 1 are attached thereto. Fig. 6 exhibits a top surface view of said bolts G and H, showing the holes therein. Fig. 7 exhibits a screen removed from the huller B. Fig. 8 is a perspective view of the thrashing attachment detached from the huller B. (Seen in Fig. 1.) Fig. 9 exhibits an end view of carrier I.

I describe the operation of my machinery as follows: A rotary motion is imparted to the cylinder D by means of a belt running on pulley K, that in turn giving simultaneous rotary motion to the pulley L and pulley 4, which in turn give simultaneous rotary motion to the pulley N, crank O, pulley V, and pulley X by means of the belts M U W, as seen in Figs. 1 and 8. The crank O imparts at the same time a longitudinal reciprocating motion to the bolts G and H by means of their pitmen P, as seen in Figs. 1 and 8, said pitmen being attached to bolts G and H by means of the wrists 1, that play in the slots 2. A rotary reciprocating motion is at the same time imparted to the carriers F and Q by means of the pulleys V and X. The operator stands upon the platform 3, lays the clover upon the inclined apron C, and as it passes between the cylinder D and concave E is thrashed and thrown upon the carrier F, and taken by it in the direction indicated by the arrow R, thrown upon the bolt G, passing along the same reaches the bolt H, and is kept in motion upon said bolts by means of their aforesaid reciprocating motion until the seed and chaff pass through the holes in the bolts G and H. It is then separated from the straw, and the straw, by means of such motion and the hooks 5 on the said bolts, as seen in Figs. 4 and 5, is carried simultaneously in the direction indicated by arrows R clear of the machine. The seed and chaff falling through the holes in the bolts G and H are received upon the bottom of the carrier-box I, and carried from thence by the carrier Q in the direction indicated by the arrows S and fall into the hopper of the huller at J.

What I claim as my invention, and desire to secure by Letters Patent, is—

1. The arrangement of double bolts inside a box so as to allow the surface of each bolt to be used as a carrier of straw and separator of seed and chaff from straw, constructed and operating as above described.

2. The arrangement of double bolts inside a box so as to allow the surface of each bolt to be used as a carrier of straw and separator of seed and chaff from straw, constructed and operating as above described, in combination with a machine for thrashing and separating clover-seed, constructed and operating as above described.

Dated Tecumseh, Michigan, June 18, 1862.

EZRA D. BURLINGAME.

Attest:
E. B. WOOD,
D. A. DODGE.